G. McKEEN.
LEATHER WORKING MACHINE.
APPLICATION FILED MAR. 18, 1909.

975,628.

Patented Nov. 15, 1910.

2 SHEETS—SHEET 1.

Witnesses:
Josephine H. Ryan
Charles D. Woodbury

Inventor:
Gordon McKeen,
by Roberts, Roberts & Cushman
Attys.

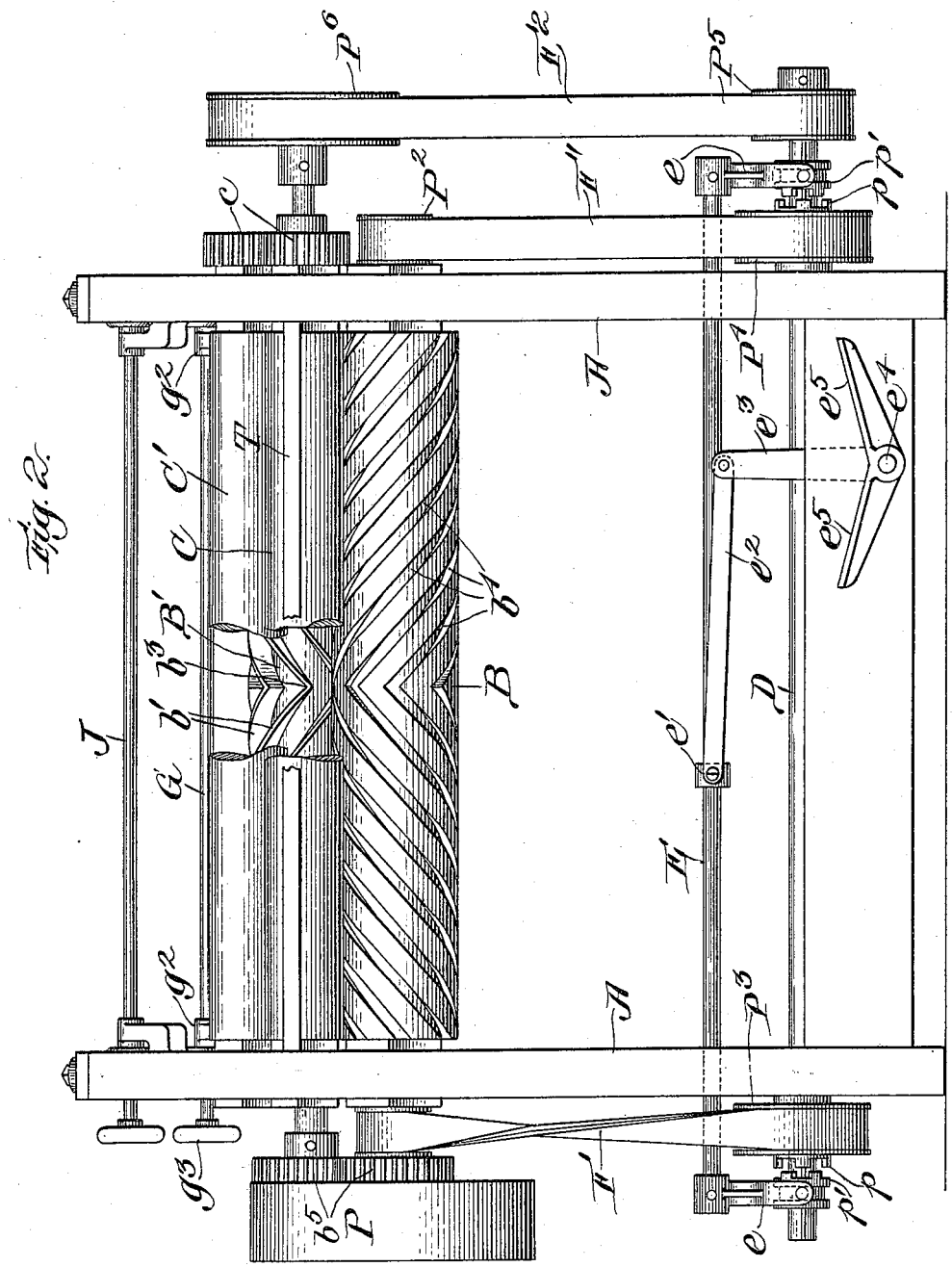

UNITED STATES PATENT OFFICE.

GORDON McKEEN, OF PEABODY, MASSACHUSETTS, ASSIGNOR OF ONE-HALF TO ERNEST A. WOELFEL, OF PEABODY, MASSACHUSETTS.

LEATHER-WORKING MACHINE.

975,628.  Specification of Letters Patent.  Patented Nov. 15, 1910.

Application filed March 18, 1909. Serial No. 484,265.

*To all whom it may concern:*

Be it known that I, GORDON McKEEN, a citizen of the United States, and resident of Peabody, in the county of Essex and State of Massachusetts, have invented new and useful Improvements in Leather-Working Machines, of which the following is a specification.

This invention relates to leather working machines for staking, stretching and the general working out of leather, and consists in the improvements hereinafter fully described and particularly pointed out in the claims.

Figure 3:
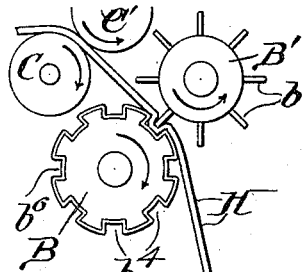
Figure 4:
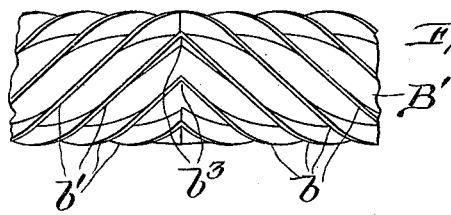
Figure 1:
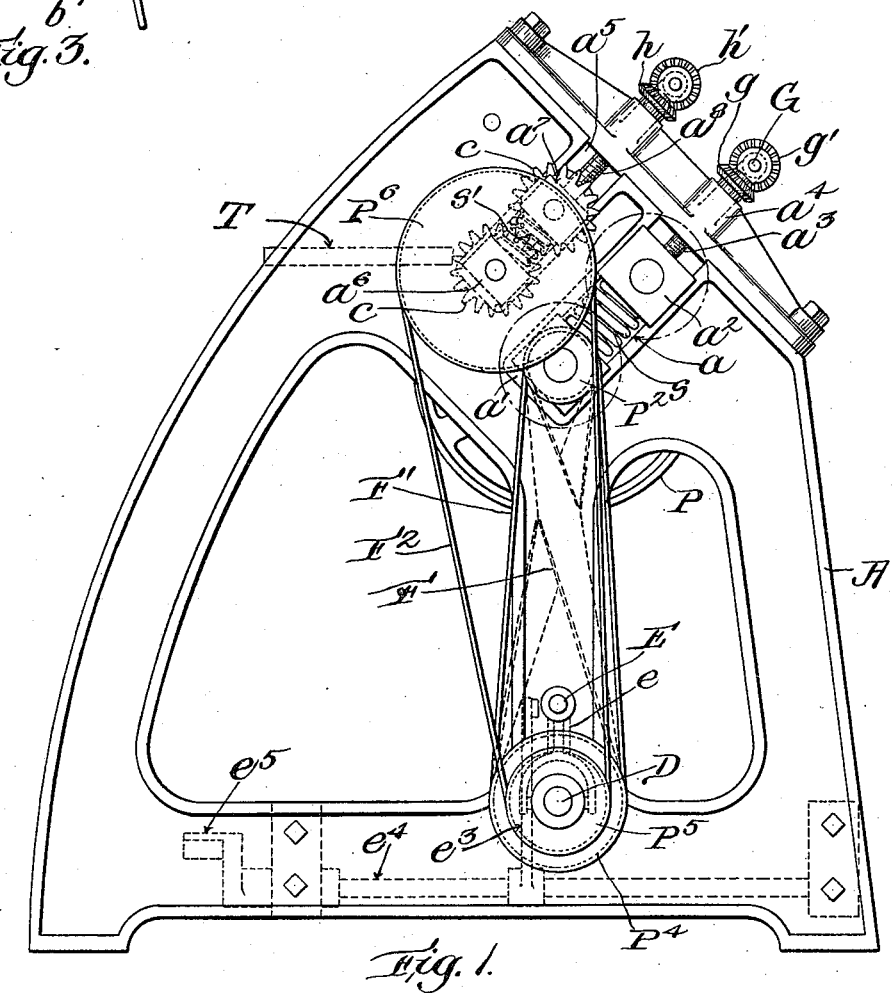

In the accompanying drawings forming part of this specification and illustrating one embodiment of the invention, Figure 1 is an end elevation of a machine embodying the invention; Fig. 2 is an elevation of the machine viewed from the left of Fig. 1, the feed rolls partly broken away to show the work rolls; Fig. 3 is a cross sectional detail view showing the relation of the work rolls and feed rolls; and Fig. 4 is a fragmentary detail view of the bladed work roll.

Referring to the drawings, A represents a frame or standard of cast iron carrying the working parts of the machine. The frame is provided at each end with an inclined slot $a$ containing the bearings for the work rolls. The lower bearing $a'$ is preferably stationary in the slot $a$ and the upper bearing is in the form of a block $a^2$ mounted to slide in said slot. A coil spring $s$ under compression is provided between said bearings and normally tends to urge said bearings apart. An adjusting screw $a^3$ passing through a screw threaded hub $a^4$ on the frame A abuts against the sliding bearing block $a^2$ and limits the extent of the separation of said bearings under the influence of spring $s$. The bearings and their associated parts are identical at each end of the frame. Extending between said bearings are two work rolls B and B'. The lower work roll B is journaled in the fixed bearings $a'$ and the upper work roll B' is journaled in the sliding bearings $a^2$. The upper roll B' is provided with a plurality of right handed helical blades or projections $b'$, and a plurality of left handed helical blades or projections $b$ diverging from each other and preferably meeting at or near the middle of the roll in the form of a V as shown at $b^3$. The lower work roll B is provided with helical grooves $b^4$ corresponding in form with the helical blades $b$ and $b'$, said grooves being wider than the blades so that the blades will run in the grooves when the rolls are rotated in opposite directions with a space or clearance between the blades and the walls of the grooves as clearly shown in Fig. 3. The work rolls B and B' are provided with spur gears $b^5$, meshing with each other, and provided with sufficiently elongated teeth to remain in mesh when said work rolls are adjusted relatively to each other as hereinafter described. Said gears are so positioned upon the rolls that the helical blades of the upper roll will project into but not touch the walls of the grooves of the lower roll, (see Fig. 3) one roll being positively driven by the other roll through said gears, with the blades running in the grooves in the aforesaid manner, so as to leave a clearance therebetween for the skin.

Above the slot $a$, a second inclined slot $a^5$ is provided in the frame A, containing the bearings for the feed rolls. These bearings are constructed and arranged similarly to the work roll bearings, the lower bearing $a^6$ being fixed the upper bearing $a^7$ sliding in the slot $a^5$, and the two bearings normally urged apart by a coil spring $s'$. An adjusting screw $a^8$ is provided, mounted similarly to the adjusting screw $a^3$ and for a similar purpose. These feed roll bearings and associated parts are identical at each end of the machine.

Extending between the corresponding feed roll bearings are two feed rolls C and C'. The lower feed roll C is journaled in the fixed bearings $a^6$, and the upper feed roll C' is journaled in the sliding bearings $a^7$. Spur gears $c$ are fixed to the feed rolls, meshing with each other and provided with sufficiently long teeth to remain in mesh when the feed rolls are adjusted relatively to each other.

Mounted in the lower part of the frame A is a countershaft D. A main driving pulley P is fixed to the shaft of one of the work rolls, preferably the work roll B mounted in fixed bearings; this main pulley P may be connected by a belt with any suitable source of power such as a driving shaft in a factory. Pulleys P' and P² are also fixed to the shaft of work roll B, one at each side of the frame. Pulleys P³ and P⁴ are loosely mounted on countershaft D, one at each side of the machine opposite pulleys P′ and P², Pulley P⁵ is fixed to the countershaft D, and pulley P⁶ is fixed to the shaft of the lower feed roll C which is mounted in fixed bearings, opposite pulley P⁵.

The pulleys P³ and P⁴ may be engaged with and disengaged from the countershaft D at the will of the operator by the following mechanism: Each pulley P³ and P⁴ is provided on its outer face with a clutch member $p$. A coöperating clutch member $p'$ is mounted on the shaft D adjacent to each clutch member $p$, and by means of a feather and groove connection rotates with the shaft but may be shifted lengthwise thereof. A shipping bar E movable lengthwise is mounted in the frame A, and is provided at each end with a forked shipping arm $e$ engaging the clutch members $p'$ so as to shift the same lengthwise of the countershaft D when the shipping bar is shifted, but not interfering with the rotation of the clutch members $p'$ with the countershaft. The shipping bar E is pivotally connected at $e'$ with a link $e^2$ which is pivotally connected with lever $e^3$ fixed to a rock shaft $e^4$ mounted in the frame of the machine transversely of the shipping rod. Two oppositely extending pedals or levers $e^5$ are fastened to the rock shaft to shift the clutches in either direction.

Power is transmitted from the main driving pulley P to the various moving parts as follows: The pulley P being mounted directly on the shaft of work roll B, the latter is driven thereby, and the other work roll B′ is driven in the opposite direction through gears $b^5$. Pulleys P′ and P² are connected respectively with pulleys P³ and P⁴ by the crossed belt F and the straight belt F′. In the position shown in the drawings the shipping bar E is in its middle position with both clutches $p'$ disengaged from the clutch members $p$ so that the loose pulleys P³ and P⁴ are running idly. If the left hand pedal $e^5$ as viewed in Fig. 2 be now depressed, the shipping bar E and the clutches $p'$ will be shifted toward the left, engaging the right hand clutch members and connecting pulley P⁴ with the countershaft D, the pulley P³ still running idly thereon. Power will thence be transmitted from pulley P⁵ through belt F² and pulley P⁶ to the lower feed roll C, and from feed roll C to feed roll C′ through gears $c$. If it be desired to reverse the direction of rotation of the feed rolls C and C′ the other pedal $e^5$ is depressed shifting the clutches in the opposite direction and disengaging the right hand clutch from pulley P⁴ and engaging the left hand clutch with pulley P³, whereupon the crossed belt F will reverse the direction of movement of the countershaft D and of the train of mechanism operated thereby.

In using the machine the operator feeds in the skin or hide to be treated from the side of the machine at the left of Fig. 1, placing the edge of the skin H between the feed rolls C and C′ which are rotated for this purpose in the direction of the arrows in Fig. 3. The skin is drawn between the feed rolls C and C′ and thence delivered between the work rolls B and B′ which rotate constantly in the direction of the arrows in Fig. 3. As will be seen from the relative sizes of the pulleys the countershaft is belted down from the shaft of work roll B, and the feed roll C is again belted down from the countershaft so that the speed of rotation or surface speed of the work rolls is considerably greater than that of the feed rolls. In practice I would recommend a relative surface speed between the work rolls and the feed rolls of about 8 or 10 to 1. When the skin passes between the work rolls B and B′ two effects are accomplished. The skin is gripped between the work rolls and by reason of their greater speed the skin is placed under tension and stretched lengthwise between the feed rolls and the work rolls. At the same time the diverging helical blades and grooves of the work rolls which engage the skin on both sides at the same time tend to spread and stretch the skin laterally. Thus the skin is stretched and worked out in all directions at a single operation of the machine. The pressure between the feed rolls is such that the skin is held between them, while being stretched lengthwise by the more rapidly revolving work rolls and laterally by the diverging projections and grooves, the relative adjustment of the work rolls being such that they will not grip the skin sufficiently to pull it away from the feed rolls but will permit the skin to slip between the work rolls. When the skin has been fed in through the feed rolls approximately to its end, the direction of rotation of the feed rolls is reversed by shipping the clutches as already described, and the skin is drawn out again by the feed rolls, the work rolls constantly operating at all times in the same direction.

To prevent the cutting, abrasion or marring of the skin during the above described operation, the rolls B and B′ are so adjusted, as already mentioned, that the blades will extend into but not touch the walls of the grooves, thus leaving a space or clearance for the skin as shown in Fig. 3. The surfaces of grooves $b^4$ are also preferably made of some soft or yielding material which will not damage the skin. This can be accomplished by covering the roll B with a sheet of felt $b^6$ or other fibrous or yielding material; and the outer corners of the grooves are preferably made slightly rounding as shown, so that the skin will not be damaged by sharp edges.

The work roll B′ is adjustable toward and from the work roll B as already described by the adjusting screws $a^3$ at each side of the machine. In order to adjust both ends of the roll equally and simultaneously, to insure the accurate relation between the blades and grooves irrespective of the care or skill of the operator, I provide each adjusting screw $a^3$ with a bevel gear $g$ engaging each a bevel gear $g'$ mounted on a transverse shaft G which is journaled on the frame in brackets $g^2$. The shaft G is operated by handle $g^3$, and when turned operates the screws $a^3$ at each end simultaneously and to the same extent through gears $g$ and $g'$. Similar gears $h$ and $h'$ similarly mounted, and operated by a similar shaft J, may be provided for turning adjusting screws $a^3$ which limit the extent of separation of the feed rolls pressed apart by springs $s'$. Such arrangement will not ordinarily be required, however, in the case of feed rolls, and in fact might often be advantageously dispensed with, especially when skins are being operated upon of varying thickness. Skins often diminish in thickness from one edge toward the other, and when that is the case it is desirable to be able to adjust the opposite ends of the feed rolls independently, so that the rolls will grip the skin with uniform pressure from end to end of the rolls.

While I have illustrated the helical projections or ribs of the upper roll as spaced apart somewhat, and the helical grooves of the lower roll similarly spaced apart so that a raised surface of substantial breadth occurs between the grooves, it will be understood that my invention is not limited to this particular form but includes two rolls, each having diverging helical projections and depressions therebetween, the projections of one roll extending into the depressions of the other, whatever may be the relative breadths of the projections and depressions. For example, both rolls might be identical in construction and the blades or projections placed closer together than is illustrated in the drawings, the projections of one roll extending into the grooves between the projections of the other roll. It is also an important feature of my invention that there shall be a sufficient space or clearance between the projections and their corresponding depressions to allow for the passage of the skin.

It will also be seen that the feed rolls not only present and deliver the skin to the work rolls, but constitute a clamp to hold the skin against the tendency of the rapidly revolving work rolls to draw the skin between them, at the same time feeding it slowly forward. Other suitable means for clamping or gripping and holding the skin and moving it forward to be operated upon by the work rolls, are within the contemplation of my invention.

A shelf or table T, supported transversely of the machine between the end frames A, is provided just in front of the feed rolls C and C', on which the skin or the edge of the skin is laid to facilitate the accurate and convenient starting of the skin between the feed rolls.

I claim:

1. In a machine of the character described, a pair of rolls, one of which is provided with diverging right and left handed helical ribs or projections and the other of which is provided with corresponding helical grooves, means to rotate said rolls with the ribs or projections of the former roll in the grooves of the latter roll, one of said rolls being mounted in a movable bearing, springs normally urging said rolls apart, and adjustable means to limit the extent of the separation of said rolls.

2. In a machine of the character described, a pair of work rolls provided respectively with diverging helical ribs or projections and corresponding helical grooves, the ribs or projections of the one extending into the grooves of the other, a pair of feed rolls to deliver and hold a skin, means to rotate said feed rolls in opposite directions to feed the skin toward the work rolls, means to rotate said work rolls in opposite directions at a higher surface speed than the surface speed of the feed rolls, and means to reverse the direction of rotation of said feed rolls.

Signed by me at Boston, Massachusetts, this seventeenth day of March 1909.

GORDON McKEEN.

Witnesses:
 ROBERT CUSHMAN,
 ERNEST A. WOELFEL.